United States Patent [19]
Sargeant

[11] Patent Number: 5,767,602
[45] Date of Patent: Jun. 16, 1998

[54] FLUTED STATOR FRAME FOR ELECTRIC GENERATORS

[75] Inventor: John Barry Sargeant, Oviedo, Fla.

[73] Assignee: Westinghouse Electric Corporation, Pittsburgh, Pa.

[21] Appl. No.: 800,188

[22] Filed: Feb. 13, 1997

[51] Int. Cl.[6] .................................. H02K 5/04; H02K 5/18
[52] U.S. Cl. .............................. 310/258; 310/58; 310/59; 310/89; 310/91
[58] Field of Search .......................... 310/58, 59, 89, 310/91, 258, 60 R, 60 A, 64

[56] References Cited

U.S. PATENT DOCUMENTS

| | | | |
|---|---|---|---|
| 1,360,483 | 11/1920 | Wiard | 310/89 |
| 1,803,570 | 5/1931 | Uggla | 310/89 |
| 3,505,546 | 4/1970 | Victor et al. | 310/55 |
| 3,643,119 | 2/1972 | Lukens | 310/60 |
| 3,787,744 | 1/1974 | Saito | 310/217 |
| 3,916,231 | 10/1975 | Cathey | 310/62 |
| 4,209,724 | 6/1980 | Periou | 310/154 |
| 4,438,558 | 3/1984 | Mitsui | 29/732 |
| 4,465,946 | 8/1984 | Springer | 310/42 |
| 4,488,072 | 12/1984 | Archibald et al. | 310/71 |
| 4,673,835 | 6/1987 | Hohnstein et al. | 310/217 |
| 4,742,257 | 5/1988 | Carpenter | 310/62 |
| 4,766,557 | 8/1988 | Twerdochlib | 364/550 |
| 4,891,540 | 1/1990 | Cooper et al. | 310/254 |
| 5,019,737 | 5/1991 | Bruno | 310/89 |
| 5,091,666 | 2/1992 | Jarczynski | 310/54 |
| 5,390,409 | 2/1995 | Courtney | 29/596 |
| 5,420,470 | 5/1995 | Fanning et al. | 310/71 |
| 5,492,004 | 2/1996 | Berg et al. | 73/40.7 |

Primary Examiner—Thomas M. Dougherty
Assistant Examiner—Tran N. Nguyen

[57] ABSTRACT

A fluted stator frame for an electric generator is provided. The fluted stator frame has a frame shell, a plurality of flat plates, a plurality of inner frame rings and a plurality of revised axial spring bars. A stator core is connected to the inner frame rings by means of the revised axial spring bars. The inner frame rings are connected to the frame shell by means of the flat plates. Each flat plate is slanted so that the plurality of flat plates are arranged in a truss formation. The spaces between the flat plates and the frame shell define gas flow ducts. The gas flow ducts provide a path for a flow of cooling gas to remove heat from the stator core of the generator.

11 Claims, 3 Drawing Sheets

FLUTED STATOR FRAME FOR ELECTRIC GENERATORS

FIELD OF THE INVENTION

The present invention relates generally to electric generators, and more particularly to stator frames for electric generators.

BACKGROUND OF THE INVENTION

Modern electric generators such as those driven by steam turbines have the capacity to carry several thousand amperes of current in their stator windings, producing a large amount of heat in the generator's stator core. Consequently, a cooling system is needed to remove the heat from the stator core during normal operation, thereby improving generator efficiency.

One type of cooling system utilizes a flow of cooling gas, such as hydrogen. The hydrogen gas, which is pressurized to achieve more effective cooling, flows axially from end to end of the stator frame within the annular space between the outer surface of the stator core and the inner surface of the frame shell. The outer surface of a cylindrical element is the term given for that surface located at the outer diameter of such cylindrical element as opposed to the inner surface, which is located at the inner diameter of such cylindrical element.

The stator frame for an electric generator supports the stator core. In a typical generator, a stator frame having a diameter of up to approximately 160 inches supports a stator core having a diameter of up to approximately 110 inches and a length of up to approximately 250 inches.

Conventional stator frames have frame rings that connect the stator core to the frame shell, providing the necessary strength to transmit gravitational and torsional forces to the foundation. The frame rings are spaced along the length of the generator in the annular space between the outer surface of the stator core and the inside surface of the frame shell.

The frame rings are connected to the stator core by means of inner frame rings. These inner frame rings are also spaced along the length of the generator and positioned at the location of each frame ring. In a typical stator frame, the frame rings as well as the inner frame rings may be situated approximately 40 to 60 inches apart, while an inner frame ring is approximately 8 inches long, i.e., in the axial direction of the stator frame.

Although the frame rings have apertures for the hydrogen gas to pass through, a significant head loss, i.e., pressure drop, occurs each time the hydrogen gas passes through one of these obstructions. In order to maximize cooling effectiveness, it is therefore, desirable to provide a cooling system that minimizes head losses of the cooling gas.

Minimizing head losses of the cooling gas by increasing the size of the apertures could have a negative effect on the radial and axial strength provided by the frame rings. It is, therefore, desirable to minimize head losses of the cooling gas without negatively impacting the radial and axial strength of the stator frame.

In conventional generators, the axial spring bars serve to secure the stator core to the stator frame, having spring characteristics selected to isolate core vibrations from the frame and the foundation on which the frames rests. Minimizing head losses of the cooling gas by increasing the size of the apertures could also negatively influence the vibratory dynamic response of the stator frame structure. It is, therefore, desirable to minimize head loss without negatively impacting the dynamic characteristics of the stator frame.

Typically, the stator core is connected to the axial spring bars after the core is placed in position. This is a demanding procedure for the existing frame-ring stator frames because of difficulty in accessing the tight location on the core lamination, i.e., the outer surface of the stator core. It is, therefore, desirable to provide a stator frame with easier access to the core laminations for connecting the stator core to the axial spring bars.

In order to obtain sufficient strength and stiffness for a conventional generator while providing holes of sufficient size for the cooling gas to pass through, there is a need for sufficient space between the outer surface of the stator core and the inner surface of the stator frame. Stator frames, however, must not exceed the weight and size restrictions for meeting shipping clearance limits. It is, therefore, desirable to provide a stator frame that reduces the shipping size of a generator.

SUMMARY OF THE INVENTION

A fluted stator frame for an electric generator is provided. The fluted stator frame comprises a frame shell, a plurality of flat plates, a plurality of inner frame rings and a plurality of revised axial spring bars.

The frame shell comprises a first cylindrical member spanning a length of the stator frame. The frame shell has an inner surface and an outer surface, and the outer surface defines the outer surface of the stator frame. Each of the plurality of flat plates has a rectangular shape, spans the length of the stator frame and each comprises an outer edge, an inner edge, an outer face and an inner face.

The inner frame rings comprise a plurality of second cylindrical members, each having an inner surface and an outer surface. The plurality of revised axial spring bars for connecting a stator core of the generator to the inner frame rings comprise spring bars located at predetermined positions along the outer surface of the stator core. As appreciated by one skilled in the art, these revised axial spring bars are profiled so as to provide the required flexibility between the stator core and the stator frame.

The stator core is connected to the inner surface of each inner frame ring by means of the revised axial spring bars. The inner frame rings are connected to the frame shell by means of the flat plates. The inner edge of each flat plate is connected to the outer surface of each inner frame ring and the outer edge of each flat plate is connected to the inner surface of the frame shell.

Each flat plate is slanted, i.e., disposed at an angle with respect to the diameter of each inner frame ring, so that the outer face of each flat plate opposes the inner surface of the frame shell and the inner face of each flat plate opposes the outer surface of each inner frame ring. The plurality of flat plates are arranged in a truss formation. The spaces between the outer faces of the flat plates and the inner surface of the frame shell define gas flow ducts or flutes. The gas flow ducts provide a path for a flow of cooling gas to remove heat from the stator core of the generator.

DETAILED DESCRIPTION OF THE PREFERRED EMBODIMENTS

Figure 1:
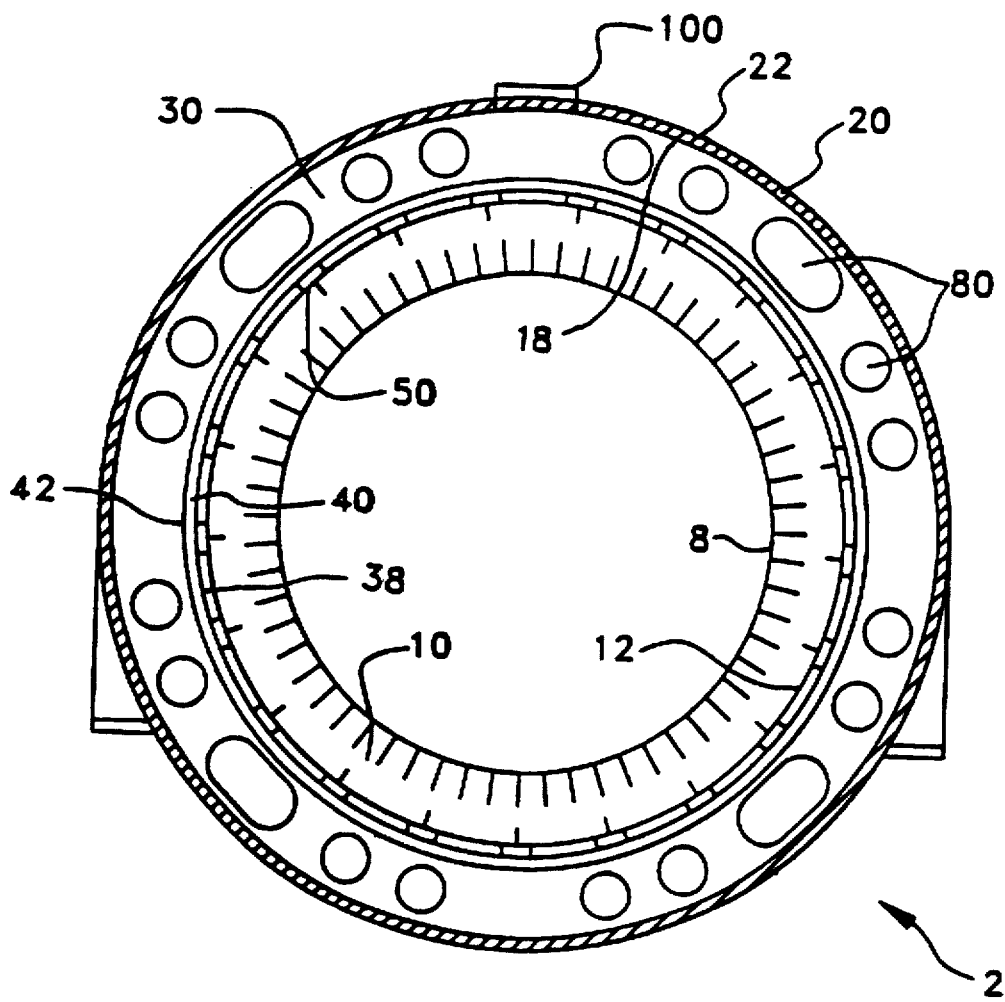
FIG. 1 is a cross-sectional view of a conventional, prior art stator frame.

Referring to the drawings, wherein like numerals indicate like elements, there is shown in FIG. 1 a conventional, prior art stator frame 2 from the Westinghouse modular line of generators in which a stator core 10 is connected to a frame shell 20 by means of annular frame rings 30. The stator core 10 has an inner surface 8 surrounding a rotor (not shown) and an outer surface 12, to which a plurality of axial spring bars 50 are attached.

Each frame ring 30 comprises an annular disc having gas flow holes 80. Attached to the inner surface of each frame ring 30 is an inner frame ring 40, a cylindrical member having an inner surface 38 and an outer surface 42. Attached to the outer surface of the frame ring 30 is the frame shell 20, a cylindrical member having an inner surface 18 and an outer surface 22.

The outer surface 12 of the stator core 10, or core lamination, is connected to the inner surfaces 38 of each inner frame ring 40 by means of the axial spring bars 50. Moving radially outward, the outer surface 42 of each inner frame ring 40 is connected to one of the frame rings 30, which is in turn, connected to the inner surface of the frame shell 20.

The frame rings 30 as well as the inner frame rings 40 are spaced along the length of the frame shell 20 at predetermined intervals. Accordingly, supporting the stator core 10 by supporting the frame shell 20 is achieved.

Cooling gas, such as pressurized hydrogen, flows axially along the length of the generator in direct contact with the spring bars 50, the inner frame rings 40 and the stator core 10 until it reaches a frame ring 30. At each frame ring 30, the cooling gas is forced to flow through the gas flow holes 80. As a result of these obstructions, the cooling gas suffers a head loss at each frame ring 30. Consequently, the frame ring 30 design of conventional stator frames 2 impairs the efficiency of generators by decreasing their cooling effectiveness.

Figure 2:
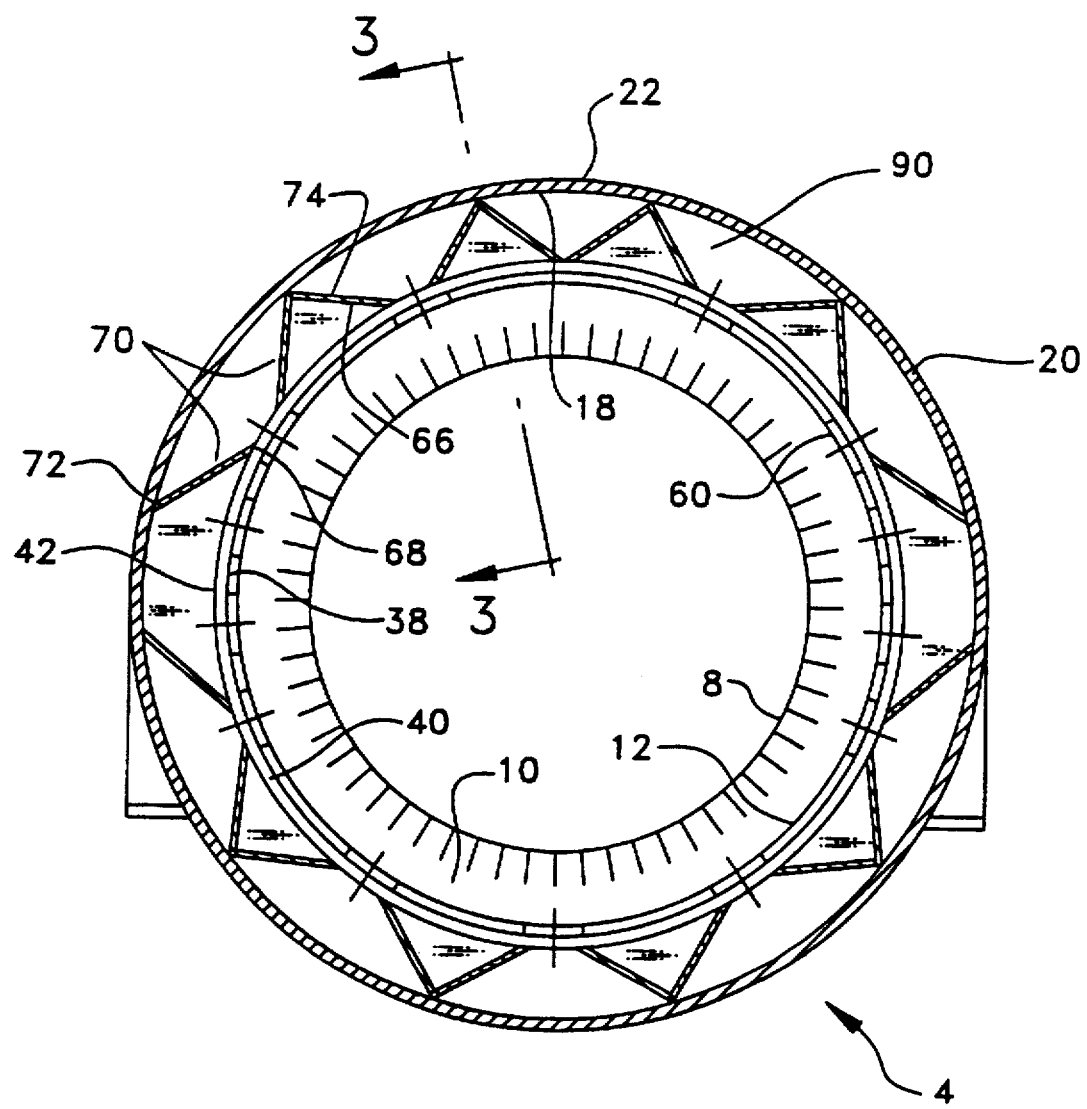
FIG. 2 is a cross-sectional view of a fluted stator frame, according to the invention.

FIG. 2 shows the preferred embodiment of a fluted stator frame 4 according to the present invention. The fluted stator frame 4 is connected to a stator core 10 and comprises a frame shell 20, a plurality of flat plates 70, a plurality of inner frame rings 40 and a plurality of revised axial spring bars 60.

The frame shell 20 is preferably a cylindrical member spanning the length of the stator frame, and as in the case of the prior art stator frame 2, the frame shell 20 has an inner surface 18 and an outer surface 22, the outer surface defining the outer surface of the stator frame. Each flat plate 70 is of rectangular shape, spans the length of the stator frame and has an outer edge 72, an inner edge 68, an outer face 74 and an inner face 66.

Each inner frame ring 40 has an inner surface 38 and an outer surface 42. The revised axial spring bars 60 may be the same as those in the prior art stator frame 2, but may be profiled so as to provide the required flexibility between the stator frame 4 and the stator core 10 and are located at predetermined positions along the outer surface 12 of the stator core 10.

As in the prior art stator frame 2, the stator core 10 of the fluted stator frame 4 is connected to the inner surface 38 of each inner frame ring 40, but is connected by means of the revised axial spring bars 60 at predetermined positions.

The inner frame rings 40 are connected to the frame shell 20 by means of the flat plates 70. The inner edge 68 of each flat plate 70 is connected to the outer surface 42 of each inner frame ring 40 and the outer edge 72 of each flat plate 70 is connected to the inner surface 18 of the frame shell 20. Each flat plate 70 is slanted so that its outer face 74 opposes the inner surface 18 of the frame shell 20 and its inner face 66 opposes the outer surface 42 of each inner frame ring 40. Together, positioned in this manner, the flat plates 70 are arranged in a truss formation.

Figure 3:
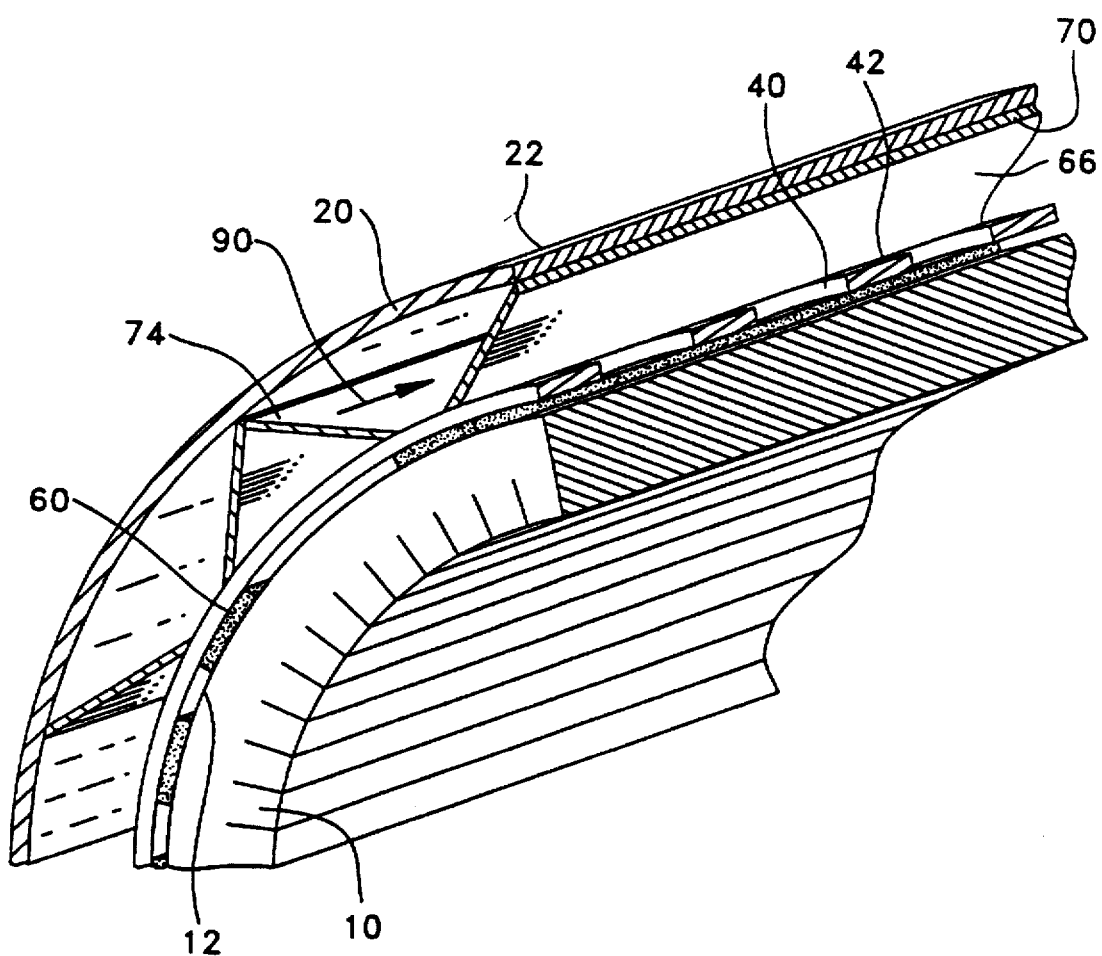
FIG. 3 is an isometric view of the fluted stator frame of FIG. 2 at line 3—3.

FIG. 3 shows an enlarged isometric view of the fluted stator frame of FIG. 2 at line 3—3. This figure displays the plurality of inner frame rings 40, the locations of the inner frame rings 40 on the outer surface 12 of the stator core 10 and the positions of the flat plates 70 on the outer surface 42 of each inner frame ring 40.

The truss formation of the fluted stator frame 4 is an important feature of the present invention. The absence of the conventional annular frame rings 30 minimizes the associated head losses on the cooling gas. With the fluted stator frame 4 design, the cooling gas flows axially and unimpeded in gas flow ducts 90, i.e., in the space between the outer face 74 of the flat plates 70 and the inner surface 18 of the frame shell 20. Consequently, head losses of the cooling gas are minimized.

The truss formation of the fluted stator frame 4 transmits the tangential stresses and shear forces between the inner frame rings 40 and the frame shell 20 in a manner similar to that of a truss arrangement on a bridge. Consequently, the radial strength and stiffness of the stator frame is enhanced. The design of the fluted stator frame 4 also enhances the axial strength and stiffness of the stator frame by having the flat plates 70 extend along the entire length of the frame.

As shown in FIG. 2, the cooling gas is contained within the space between the flat plates 70, i.e., flutes and the frame shell 20. Because the cooling gas is no longer in direct contact with the outer surface 12 of the stator core 10, induced cooling is eliminated. This reduces the radial temperature gradient through the yoke of the stator core 10. Consequently, combined with the improved strength and stiffness characteristics, the fluted stator frame 4 reduces thermally induced stresses in the stator core 10.

As shown in FIG. 2, the fluted stator frame 4 of the present invention also provides for easier access to the core lamination 12 for connecting the core 10 to the revised axial spring bars 60 than does the access 100 provided in the prior art stator frame 2. The prior art frame rings 30 no longer interfere with access, and relatively large accesses to the spring bars 60 are provided with the slanted plate 70 design. Absence of the prior art frame rings 30 also facilitates access to the spring bars 60 from the axial direction.

The fluted stator frame 4 also allows for a reduction in the space between the outer surfaces 42 of the inner frame rings 40 and the inner surface 18 of the frame shell 20. The truss formation of the flat plates 70 naturally provides for the gas flow ducts 90 for the cooling gas to pass through. In the prior art stator frame 2, extra space is needed to accommodate the gas flow holes 80 and even larger frame rings 30 are needed to maintain the strength and stiffness of the frame 2 in light of the gas flow holes 80. This problem is eliminated by the present invention. Consequently, the fluted stator frame 4 design provides for a stator frame that reduces the shipping size of a generator.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A fluted stator frame for an electric generator comprising:

a frame shell having a length spanning a length of said stator frame, the frame shell having an inner surface and an outer surface, the outer surface of the frame shell defining an outer surface of said stator frame;

a plurality of rectangular flat plates, each having a length spanning the length of said stator frame, and each comprising an outer edge and an inner edge; and a plurality of cylindrical inner frame rings, each inner frame ring having an inner surface and an outer surface;

said inner frame rings being connected to said frame shell by said flat plates, said inner edges of said flat plates being connected to said outer surface of each said inner frame ring and said outer edges of said flat plates being connected to said inner surface of said frame shell;

wherein each flat plate is entirely slanted so that an outer face of each flat plate opposes said inner surface of said frame shell and an inner face of each flat plate opposes said outer surface of each inner frame ring, said plurality of flat plates defining a truss.

2. The fluted stator frame of claim 1 wherein said frame shell comprises a first cylindrical member spanning the length of said stator frame and said inner frame rings comprise a plurality of second cylindrical members.

3. The fluted stator frame of claim 1 wherein the inner frame rings are disposed within the frame shell to define a space between the inner surface of the frame shell and the outer surface of each inner frame ring, the flat plates being spaced apart to define spaces therebetween, at least one of said spaces between said flat plates and said inner surface of the frame shell and the outer surface of each inner frame ring defining a gas flow duct for providing a path for cooling gas to flow to remove heat from said stator frame.

4. The fluted stator frame of claim 1 wherein there are spaces between said outer faces of said flat plates and said inner surface of said frame shell, said spaces defining gas flow ducts, said gas flow ducts providing a path for cooling gas to flow to remove heat from said stator core of said generator.

5. The fluted stator frame of claim 1, wherein the outer edges of selected ones of the flat plates are positioned adjacent to each other.

6. A fluted stator frame for an electric generator comprising:

a cylindrical frame shell having a length spanning a length of said stator frame, the frame shell having an inner surface and an outer surface, the outer surface of the frame shell defining an outer surface of said stator frame;

a plurality of rectangular flat plates each having a length spanning the length of said stator frame, and each comprising an outer edge, an inner edge, an outer face and an inner face; and a plurality of cylindrical inner frame rings, each inner frame ring having an inner surface and an outer surface;

said inner frame rings being connected to said frame shell by said flat plates, said inner edges of said flat plates being connected to said outer surface of each said inner frame ring and said outer edges of said flat plates being connected to said inner surface of said frame shell, each said flat plate being entirely slanted so that said outer face of each flat plate opposes said inner surface of said frame shell and said inner face of each flat plate opposes said outer surface of each said inner frame ring, said plurality of flat plates defining a truss.

7. The fluted stator frame of claim 6 wherein there are spaces between said outer faces of said flat plates and said inner surface of said frame shell, said spaces defining gas flow ducts, said gas flow ducts providing a path for cooling gas to flow to remove heat from said stator core of said generator.

8. The fluted stator frame of claim 6, wherein the outer edges of selected ones of the flat plates are positioned adjacent to each other.

9. A fluted stator frame for an electric generator comprising:

a cylindrical frame shell having a length spanning a length of said stator frame, the frame shell having an inner surface and an outer surface, the outer surface of said frame shell defining an outer surface of said stator frame;

a plurality of rectangular flat plates each having a length spanning the length of said stator frame, and each comprising an outer edge, an inner edge, an outer face and an inner face;

a plurality of cylindrical inner frame rings, each inner frame ring having an inner surface and an outer surface; and a plurality of revised axial spring bars for connecting a stator core of the generator to said inner frame ring, said revised axial spring bars comprising spring bars arranged at predetermined positions along said outer surface of said stator core;

said stator core being connected to said inner surface of each said inner frame ring by said revised axial spring bars, said inner frame ring being connected to said frame shell by said flat plates, said inner edges of said flat plates being connected to said outer surface of said inner frame ring and said outer edges of said flat plates being connected to said inner surface of said frame shell, each said flat plate being entirely slanted so that said outer face of each flat plate opposes said inner surface of said frame shell and said inner face of each flat plate opposes said outer surface of each said inner frame ring, said plurality of flat plates defining a truss.

10. The fluted stator frame of claim 9 wherein there are spaces between said outer faces of said flat plates and said inner surface of said frame shell, said spaces defining gas flow ducts, said gas flow ducts providing a path for cooling gas to flow to remove heat from said stator frame.

11. The fluted stator frame of claim 9, wherein the outer edges of selected ones of the flat plates are positioned adjacent to each other.

* * * * *